July 30, 1963  J. O. PUGH ETAL  3,099,069
METHOD OF CAPACITOR MANUFACTURE
Filed Sept. 12, 1960
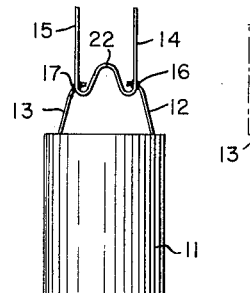
FIG. 1
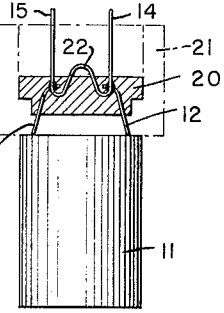
FIG. 2
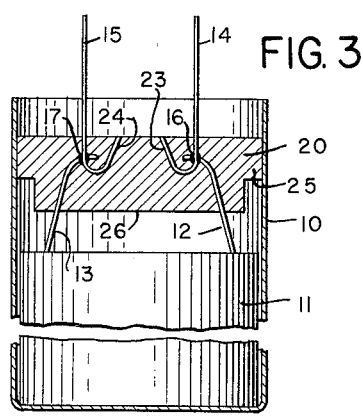
FIG. 3
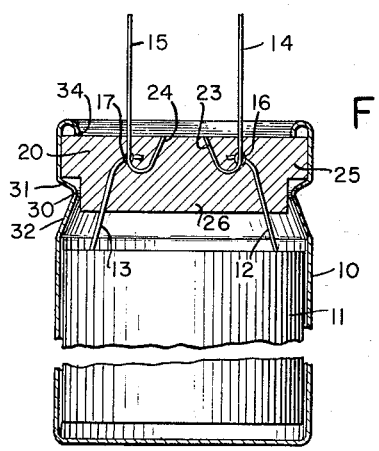
FIG. 4
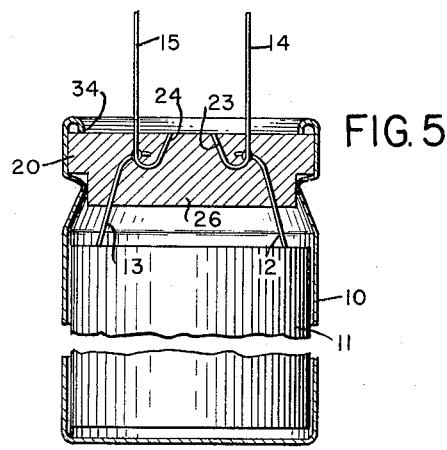
FIG. 5
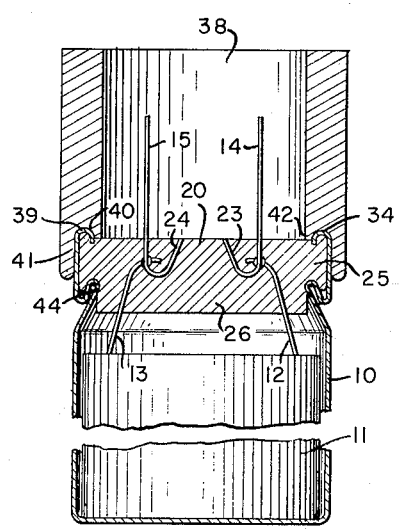
FIG. 6
FIG. 7
INVENTOR
J. O. PUGH
W. J. KIRKPATRICK
BY 
ATTORNEY

United States Patent Office 3,099,069
Patented July 30, 1963

3,099,069
METHOD OF CAPACITOR MANUFACTURE
James O. Pugh and William J. Kirkpatrick, Nashville, Tenn., assignors to Nashville Electronics, Inc., a corporation of Tennessee
Filed Sept. 12, 1960, Ser. No. 55,236
1 Claim. (Cl. 29—25.41)

This invention relates to hermetic sealing and more particularly to a seal for an encasement of the type adapted for electrical components such as capacitors. The invention further relates to a novel encasement for an electrical component and to the method for its manufacture.

In the present day manufacture of electrolytic capacitors for use in electronic circuits it is customary to form a cylindrical capacitor section with leads extending therefrom, the section being housed within a ceramic or metal sleeve, and to provide seals at one or both ends of the sleeve through which the conductors extend. The capacitor section commonly includes a thin ribbon of etched aluminum, having an oxide surface, which is rolled adjacent to a separator paper on the other side of which a thin ribbon of etched aluminum is rolled, the assembly being impregnated with a suitable electrolyte which is absorbed by the paper. In such arrangement the coated aluminum strip per se constitutes the anode, its oxide coating the dielectric, and the electrolyte the cathode, the uncoated strip of aluminum serving as a contact medium for the electrolyte.

The useful life of a capacitor of such type, assuming it is not abused and does not leak, depends upon its freedom from corrosive impurities. The electrolyte is an aqueous solution, and during use the vapor pressure of the water therein and of the hydrogen which is given off during electrolysis causes an increase of pressure within the container, such pressure increasing with rise in temperature. Of the two, the hydrogen creates the greater increment of pressure. If such pressure exceeds the sealing capacity of the device, a leak results, which brings on rapid breakdown. In order to meet the problem, two approaches have been used, namely, restricting the pressure created, by selection of appropriate electrolyte, as well as using materials of higher purity, and providing a container and seal structure capable of withstanding high internal pressures. The present invention is directed to the latter.

In the sealing of units such as capacitors, two principal means have been employed. In one, the end of the container is filled with a material such as an epoxy resin, which hardens after a short time. However, particularly at high temperatures, such end seals have sometimes permitted leakage next to the casing or along the lead wire. Such end seals have also presented a problem in that they may contain substances such as curing agents which contact the electrolyte and produce corrosion. Another drawback to the use of the epoxy resin end seal is the large amount of labor required to place the resin into the container.

Another means of providing an end seal has been to employ a solid substance such as rubber, or a rubber-encased plug of a harder material, adequate to maintain a seal around the leads. In order to maintain an end seal in such a capacitor it is necessary to allow for expansion and contraction over a relatively wide temperature range, the design conditions for certain applications being from minus 40 to plus 90° C. Minute separation of the casing from the sealing material or the latter from the leads may permit the unit to leak, leading to its breakdown. Hence, heretofore, such seals have reqired that a relatively soft, flexible material such as rubber be employed as a contact between the encasement and the sealing member and a relatively harder material has been associated with the softer material in order to add strength and to improve the sealing contact, particularly with the leads. In some instances the end sealing member has been a plug of ceramic, hard plastic, or fibrous substance having a sleeve or sealing member of relatively soft rubber which permits a firm contact to be maintained between the rubber and the container over a relatively wide temperature range. Such rubber element end seals have oftentimes been relatively expensive to produce and have been limited to the smaller size capacitors, due to the fact that soft material such as rubber distorts in the larger sizes, i.e., greater than approximately one-half inch diameter.

In order to employ a relatively hard material alone, as an end seal, various formations for crimping or locking the seal to the container have been tried. However, these have only been moderately successful for lower temperature application, since the joint has not been sufficiently strong to withstand higher pressures and dimensional variations accompanying a wide temperature range.

Accordingly, it is an object of the present invention to provide a high strength end seal for an encasement such as an electrolytic capacitor which is relatively easy to form and has high strength;

A further object is the provision of an end seal including a relatively hard plug connected to an encasement in a novel manner which permits wide temperature variation and maintains a seal against relatively high pressure;

A further object is to provide a novel method for forming an end seal for a device such as an electrolytic capacitor;

A further object is to form a strong bond between the end portion of an encasement and a relatively hard plug mounted in its end which permits wide temperature variation without injuring the connection between the encasement and the plug;

A further object is to provide a novel means for producing an electrolytic capacitor end seal.

These and other objects of the invention will become apparent from the following description taken in conjunction with the accompanying drawing in which:

FIG. 1 is a side elevation of a capacitor section with riser wires connected to the capacitor leads, in accordance with one method of practicing the invention;

FIG. 2, a side elevation with portions broken away of the unit of FIG. 1 with a plug molded around the riser wires and capacitor leads, and schematically indicating the mold;

FIG. 3, an enlarged fragmentary vertical section of the unit of FIG. 2 inserted in a can;

FIG. 4, an enlarged fragmentary vertical section showing the open end of the can turned in and an annular groove in such can;

FIG. 5, a view similar to FIG. 4 showing the can partly crimped;

FIG. 6, a view similar to FIG. 4 showing the article in completed form; and

FIG. 7, a view similar to FIG. 6 illustrating a modified form.

Briefly stated, the present invention includes a relatively hard plastic plug having a shoulder at one side for receiving and guiding an internal bead of the encasement can upwardly and inwardly when axial force is applied against the end of the encasement member. Such axial force causes the bead to collapse inwardly into sealing engagement with the plug at the same time that the inwardly rolled end of the encasement is forced into the other face of the plug, the two portions being embedded in the plug from opposite directions to form a tight seal therewith. The plug is initially molded onto the junction of a lead wire connected to the conductors from the capacitor section, and after the plug has set the connecting portion of the lead wire is removed, the portion remaining within the plug providing a strong mechanical connection therewith.

With further reference to the drawing, a capacitor is illustrated which includes an encasement or can 10 which is preferably of aluminum. Within the can and substantially filling the major portion thereof is a capacitor unit 11, which may be of the rolled type previously described, although the invention is not restricted thereto. Extending from the capacitor unit are tab wires 12, 13 which are welded to riser wires 14, 15 at joints 16, 17, the latter wires being provided for connection to other leads. The joints 16, 17 and the adjacent portions of the tab and riser wires are positioned within a plastic slug or plug 20 to which the end portion of the can 10 is crimped in a novel manner to provide a firm locking engagement.

The plug 20 is formed from a thermoplastic such as polypropylene which is relatively dimensionally stable up to 90° C. Other material may be used, such as a product of the Minnesota Mining & Manufacturing Company, designated "Kel-F," described as a low molecular weight polymer of chlortrifluoroethylene. It is necessary that such material be relatively hard but sufficiently cold-flowable to permit the bonding action to occur, as such bonding action could not take place with an unflowable rigid material such as glass or a ceramic.

In order to form the plug 20, the tab and riser wires are positioned within a mold 21 with the connections 16, 17 approximately midway, and the plastic is injected thereinto. The risers 14, 15 are at that time formed of a single length of wire with a loop 22 protruding from the mold cavity. Such loop 22 may assist in accurately positioning the wires within the cavity. After the plug is formed, the protruding loop 22 is removed. This leaves within the plug risers 14, 15 having loop portions 23, 24 which provide firm contact with the plug. In the positioning of the wires within the mold cavity the risers 14, 15 may be spaced apart as required.

The plug 20 is substantially cylindrical and has a relatively large base 25 and a reduced portion 26, the axial height of the base 25 being approximately one half the thickness of the plug. In order to mount the capacitor section and the plug within the can, the preferred procedure is illustrated in FIGS. 3 to 6.

Such procedure includes first placing the capacitor section in the can and adjacent to the closed end, as indicated in FIG. 3. The capacitor section is of a diameter which fits snugly within the can, thus taking full advantage of the space provided. Next, an initial bead 30 is turned inwardly of the can beneath base portion 25 of the plug 20. Such bead is formed with its upper wall 31 inclined more steeply than its lower wall 32 as seen in FIG. 4, and tends to lift the plug and attached capacitor section away from the closed end of the can. The open end of the can is rolled over to provide a reversely turned end 34. The sequence of forming the bead 30 and the rolled over end 34 is discretionary. The space between the inwardly projecting end 34 and the bead 30 is sufficient that the bead is not forced outwardly, nor is the end 34 forced into the plug.

Next, the final seal is formed by the application of an end collapsing tool 38 of cylindrical configuration having a peripheral recessed portion 39 for snugly engaging the outer end curved portion 40 of the can and having an overhanging portion 41 which engages the end portion of the can on its outer side. On its inner side the tool has a shorter leg 42 whose end engages the plug 20 after the end 34 of the can has been pressed into the plug a predetermined amount. The can is mounted in a suitable support such as a collet and the end collapsing tool is forced against the open end of the can. Initially, this causes the bead 30 to collapse inwardly as indicated in FIGS. 5 and 6 until it engages the outer surface of the reduced portion 26 of the plug. Since the bead is inclined toward the open end of the can, it rides along the plug toward such open end and forms a fold 44 which becomes indented into the under side of the base portion 25 of the plug. At the same time the end 34 of the can is forced into the outer surface of the plug. The material of the plug flows around the fold portion 44 of the can and the end 34, thereby forming a locking engagement therewith which is resistant to separation in either axial or radial direction.

In the crushing action described the can is foreshortened, which moves the capacitor section back to the end of the can as indicated in FIG. 6.

As a result of forming the locking engagement described, a relatively hard plastic such as polypropylene may be employed which is sufficiently strong to withstand high pressure, and at the same time the locking engagement therewith may be maintained over a wide temperature range.

In the modification of FIG. 7 a relatively soft, flexible washer 50 is positioned over the exposed surface of the plug for engagement by the turned-over end 34 of the can. Such embodiment may be useful for very high temperature application or in the event that the plastic which is used does not permit of a satisfactory locking engagement under the design conditions.

Accordingly, it will be understood that the present invention includes the provision of an end seal for a sleeve, and novel means whereby a relatively hard but flowable plug may be engaged by the end of said sleeve in such a manner that hermetic sealing may be maintained despite relatively wide variation in temperature.

The invention includes the molding of a plug about the connections from the capacitor section in a novel manner to provide a simple yet strong physical connection between such plug and the leads which extend therefrom.

It will be obvious to one skilled in the art that various changes may be made in the invention without departing from the spirit and scope thereof and therefore the invention is not limited by that which is illustrated in the drawing and described in the specification, but only as indicated in the accompanying claim.

What is claimed is:

The method of sealing a capacitor section within a metal sleeve having an open end, said section having lead means extending from an end, comprising molding a relatively hard flowable plastic slug onto the lead means, said slug having a main base at its outer end and a portion of reduced diameter adjacent to said base, positioning said capacitor unit with said slug attached within the can, rolling a bead into the can between the capacitor section and the base portion of the slug, such bead being inclined toward the open end of the can, and rolling the end of the can inwardly so that the edge portion extends toward the slug, and crushing the rolled end of the can axially to force the bead to collapse inwardly to engage the reduced portion of the slug and be folded inwardly and upwardly into said slug at the same time that the inwardly turned edge of the can is forced into the outer surface of the slug.

References Cited in the file of this patent

UNITED STATES PATENTS

| | | |
|---|---|---|
| 2,338,485 | Beyer | Jan. 4, 1944 |
| 2,825,855 | Frekko | Mar. 4, 1958 |
| 2,848,793 | Pityo | Aug. 26, 1958 |
| 2,891,362 | Bettridge | June 23, 1959 |
| 2,904,618 | Robinson et al. | Sept. 15, 1959 |
| 2,940,161 | Elarde | June 14, 1960 |
| 2,941,024 | Lamphier | June 14, 1960 |
| 2,942,332 | Wright et al. | June 28, 1960 |
| 2,944,324 | Moyer | July 12, 1960 |